No. 860,736. PATENTED JULY 23, 1907.
O. J. DAVY & E. H. BECKER.
AERIAL TRAMWAY.
APPLICATION FILED JUNE 4, 1907.
6 SHEETS—SHEET 1.
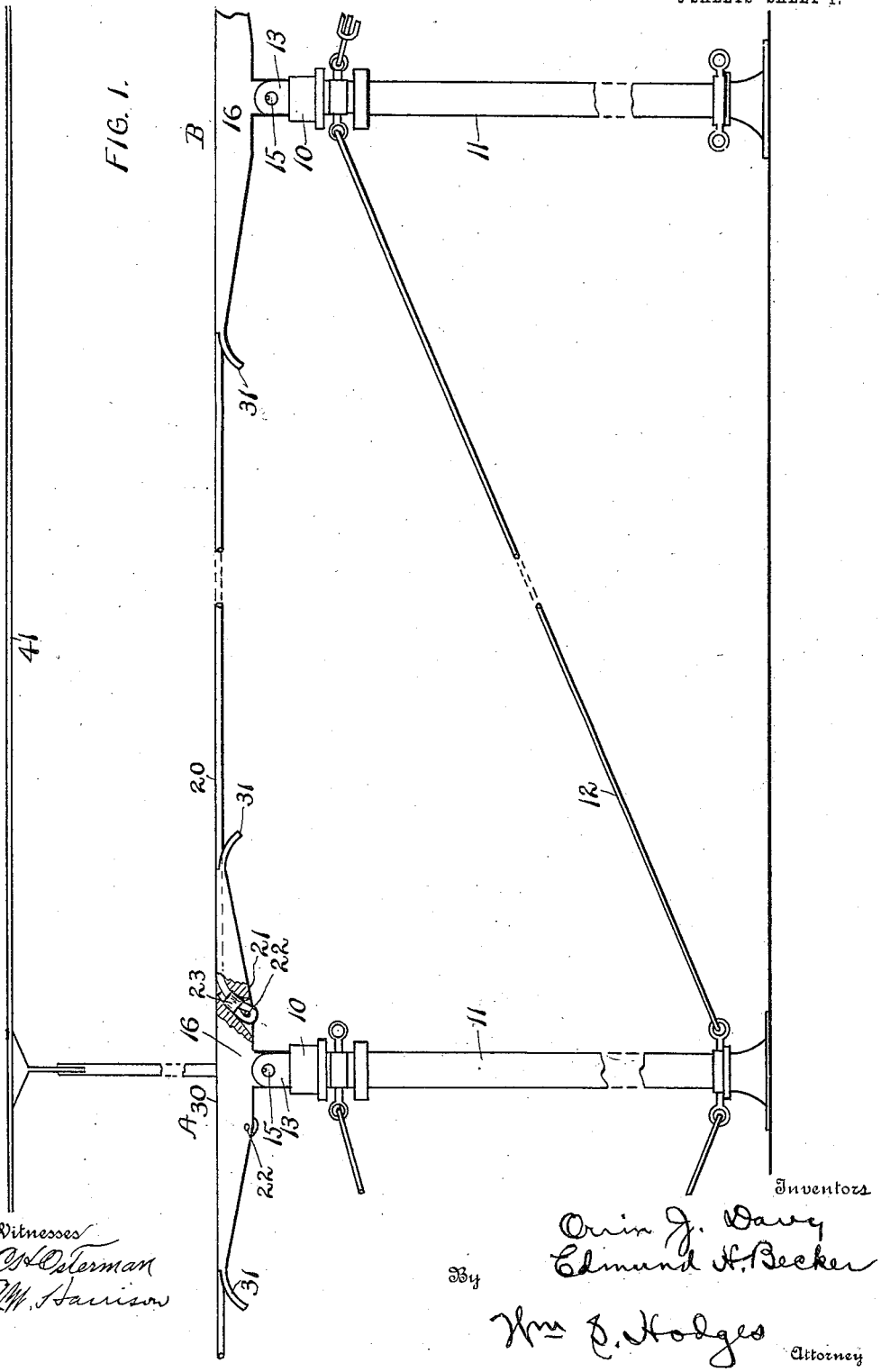

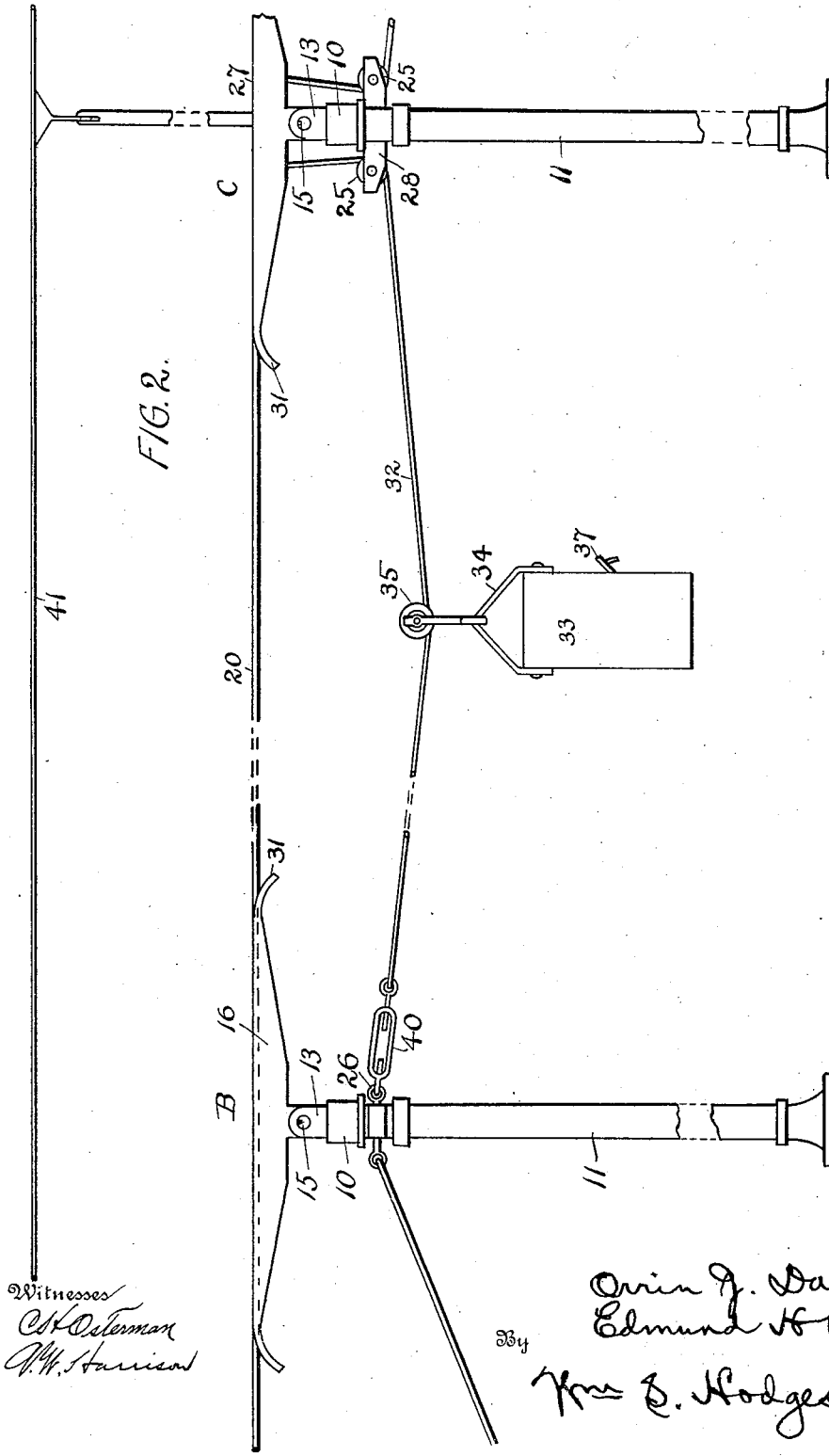

No. 860,736. PATENTED JULY 23, 1907.
O. J. DAVY & E. H. BECKER.
AERIAL TRAMWAY.
APPLICATION FILED JUNE 4, 1907.
6 SHEETS—SHEET 3.
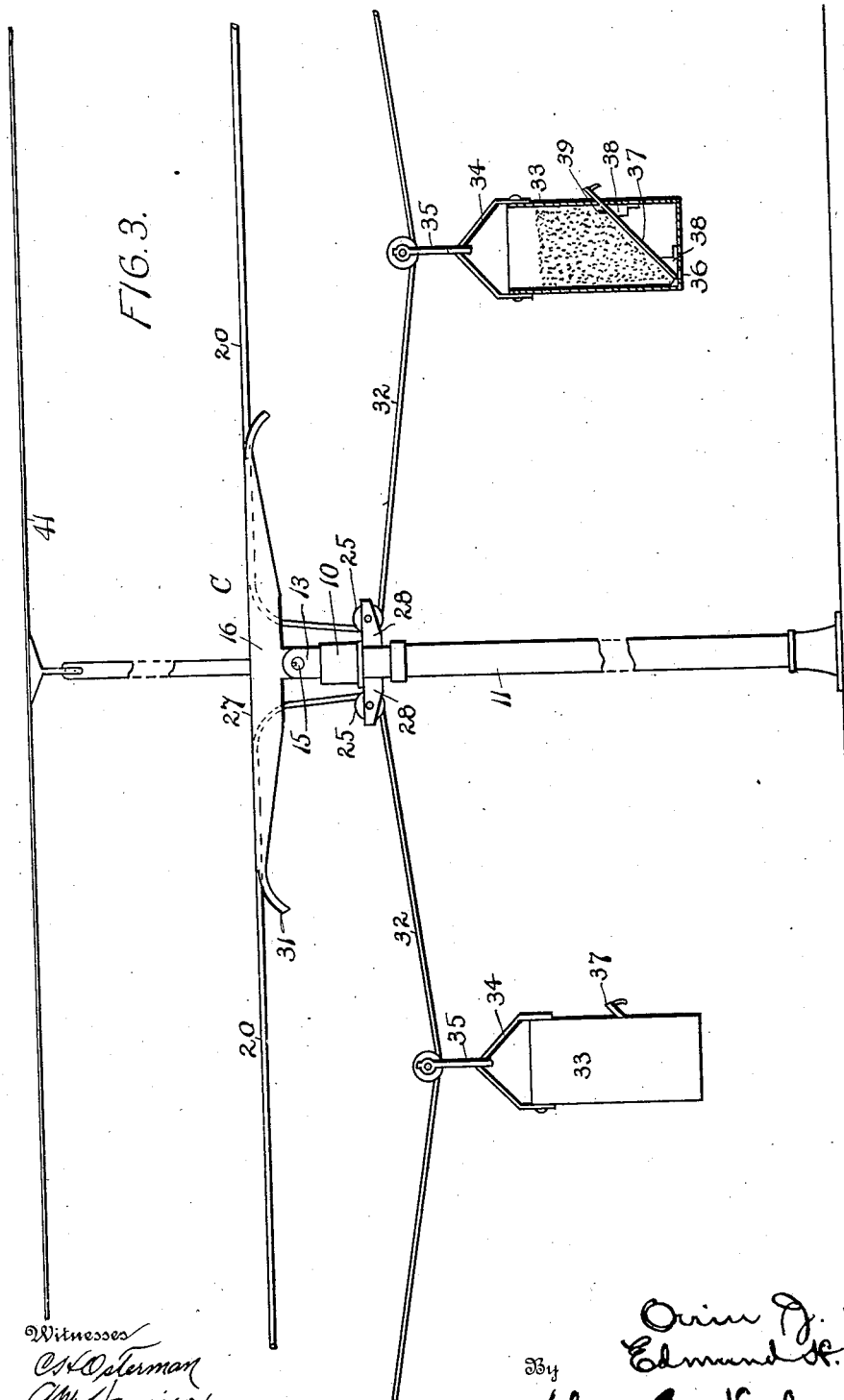

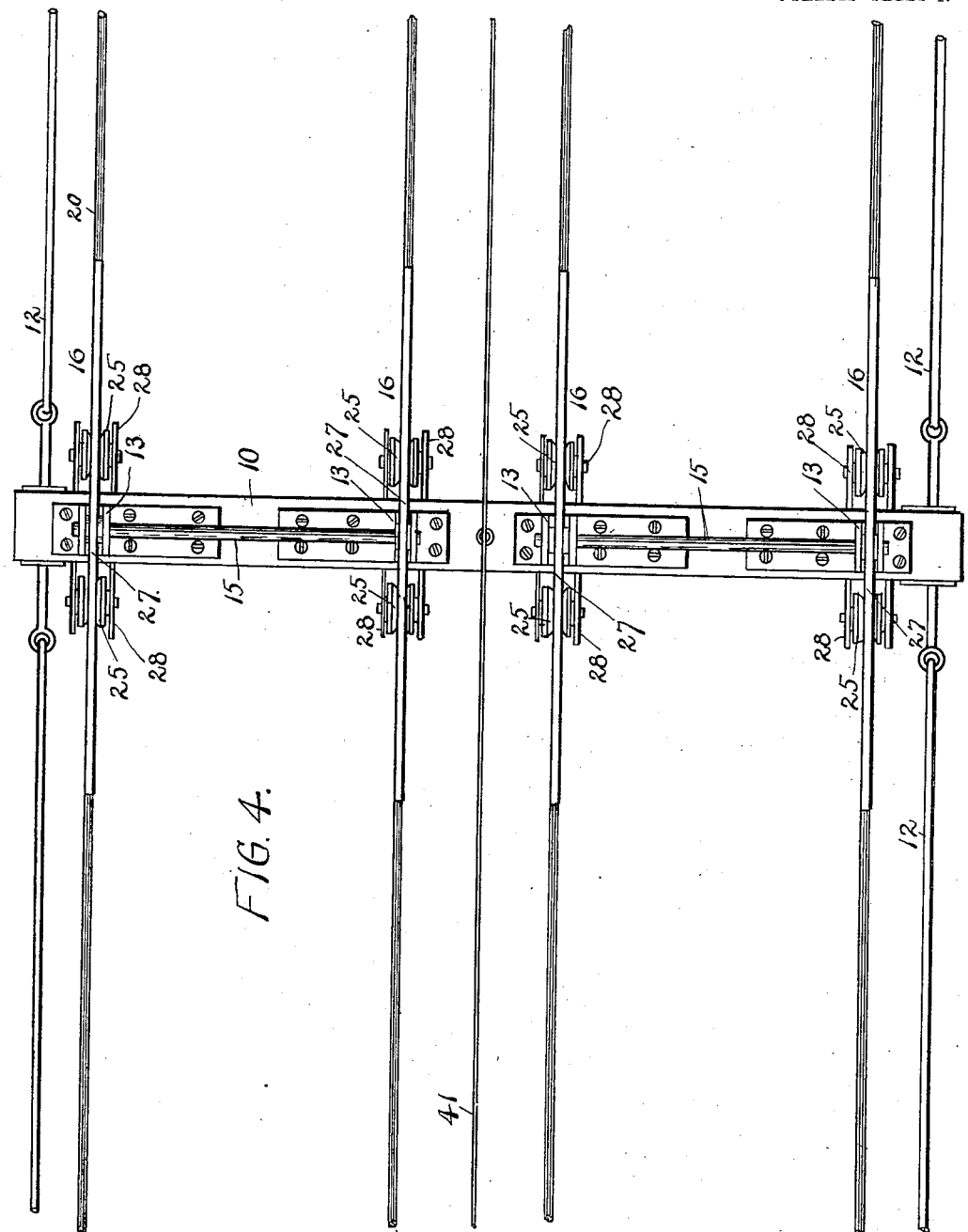

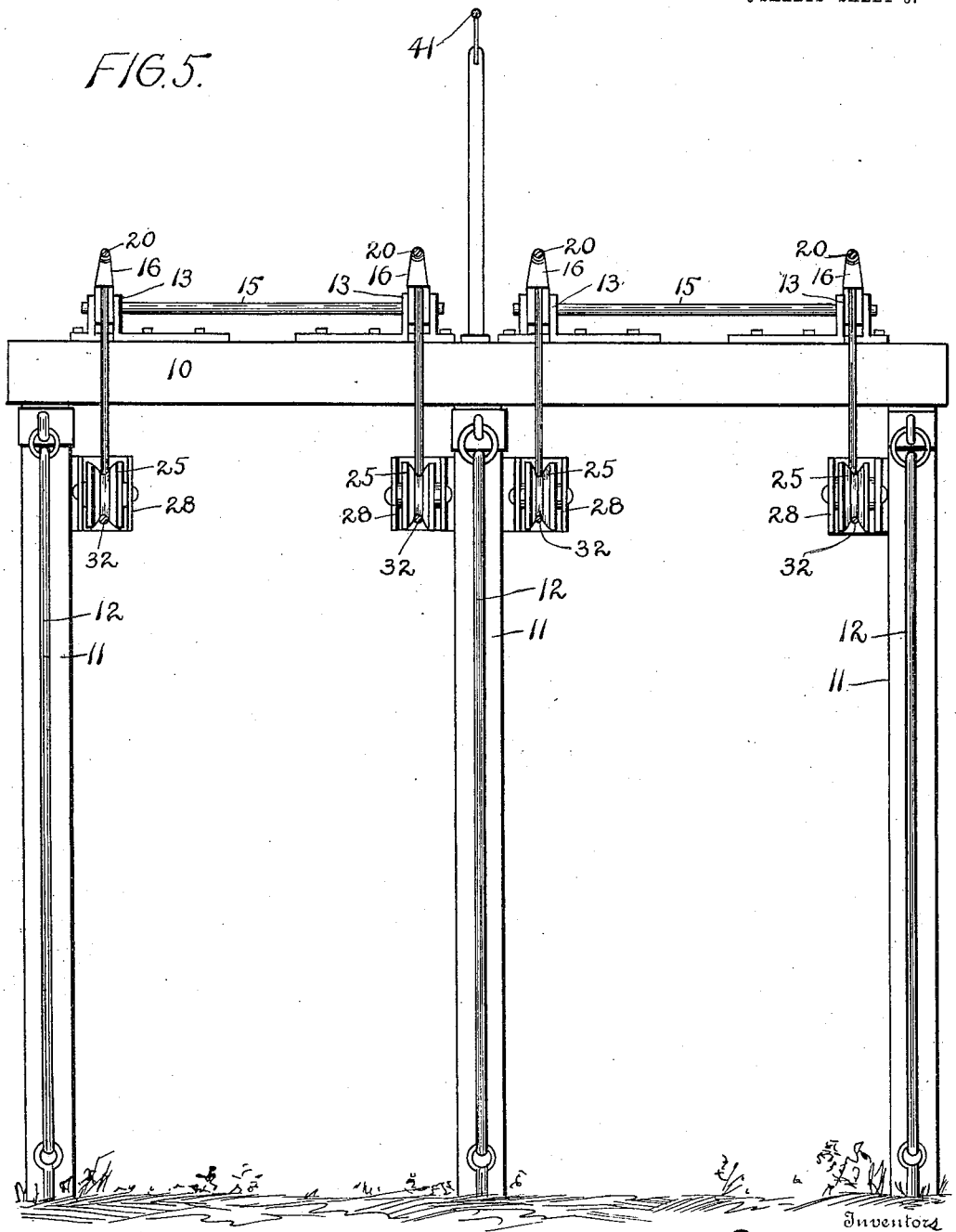

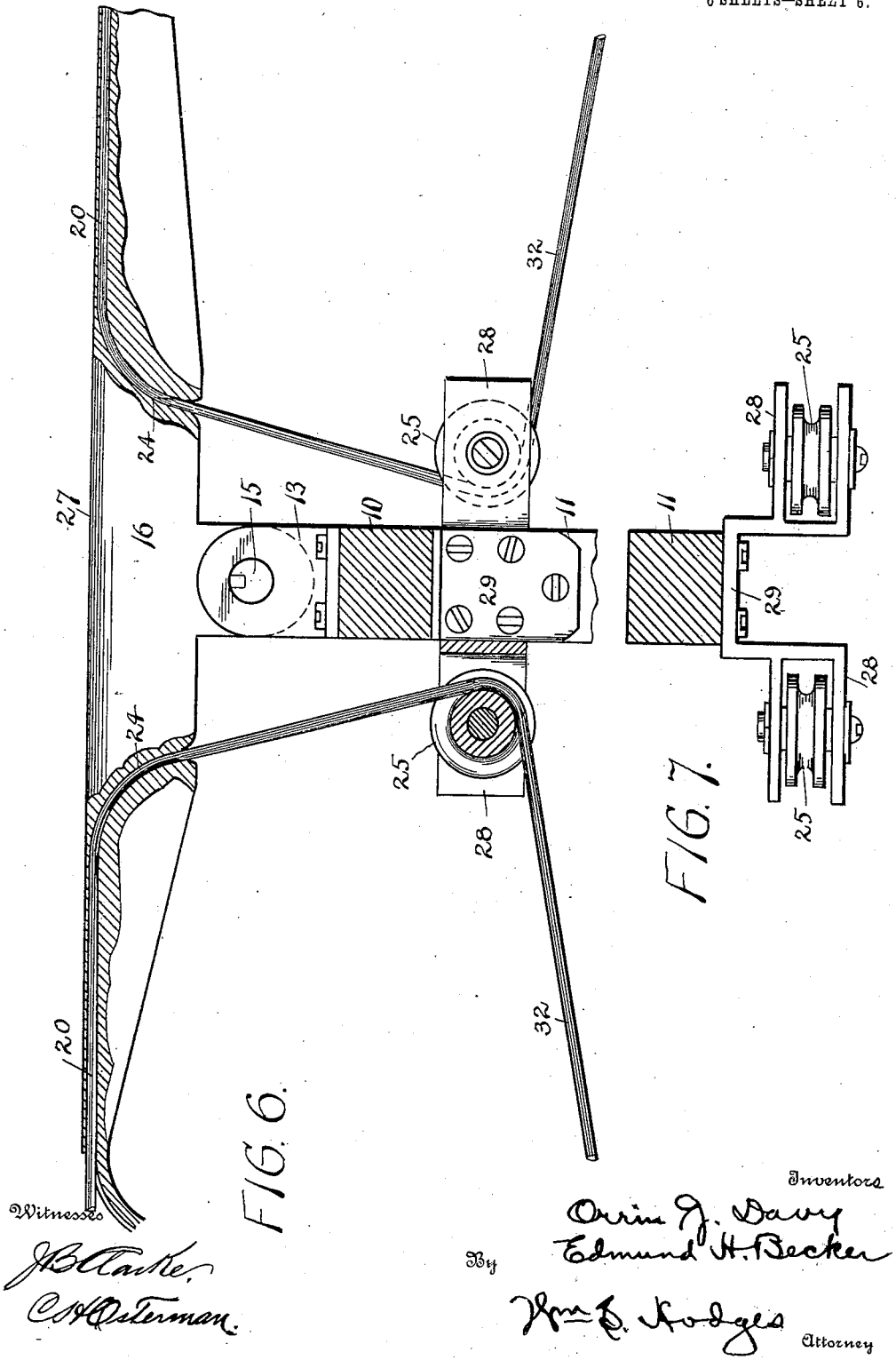

UNITED STATES PATENT OFFICE.

ORRIN J. DAVY AND EDMUND H. BECKER, OF WASHINGTON, DISTRICT OF COLUMBIA, ASSIGNORS, BY MESNE ASSIGNMENTS, TO INDUSTRIAL MOTOR COMPANY, A CORPORATION OF THE DISTRICT OF COLUMBIA.

AERIAL TRAMWAY.

No. 860,736.   Specification of Letters Patent.   Patented July 23, 1907.

Application filed June 4, 1907. Serial No. 377,271.

*To all whom it may concern:*

Be it known that we, ORRIN J. DAVY and EDMUND H. BECKER, citizens of the United States, residing at Washington, in the District of Columbia, have invented certain new and useful Improvements in Aerial Tramways, of which the following is a specification.

This invention contemplates certain new and useful improvements in aerial tramways and relates more particularly to elevated systems in which the tracks or rails are formed of flexible cables.

The invention has for its object the production of an improved railway system that is particularly adapted for places of amusement, the cables forming the tracks being supported in such a manner that the slack occurring between the supports will impart an undulating movement to a car as the latter passes over from one support to another, whereby the passengers experience the peculiar and fascinating sensation of a sudden coasting ending with a quick and frequent rise preparatory to another coast which they feel helpless to prevent.

A further object of the invention is to provide a system of the character referred to which can be located above stationary amusements and operated at high speed with perfect safety and without interfering with or interference from the adjacent amusements.

A further object is to provide a railway system which may be safely operated at an elevation above the normal street grade, whereby high speed can be attained without interference from the street traffic and without endangering the lives of the operators and passengers.

A further object of the invention is to provide improved rocker arms to support the cables forming the tracks of the system.

A further object is to provide a track formed of comparatively short sections of cable, and also to provide a means for maintaining the track cables in a taut condition and for regulating the stretch of the said cables to conform to the load to be supported thereby.

The invention will be hereinafter fully set forth and particularly pointed out in the claims.

In the accompanying drawings: Figures 1, 2 and 3 are side elevations of successive sections of my improved aerial tramway. Fig. 4 is a plan view of one of said sections. Fig. 5 is a transverse sectional view thereof. Fig. 6 is an enlarged view of one of the rocker arms, parts being broken away and shown in section. Fig. 7 is a detail.

Referring to the drawings, a series of spaced apart cross beams 10 are provided, the same being supported by suitable pillars or standards 11, and braced by stays 12. Each cross beam 10 serves as a foundation support for one or more bearings 13, in which are mounted rock shafts 15, each of said shafts being provided with a pair of rocker arms 16, said arms being rigidly secured to said rock shaft in any suitable manner.

In our complete system we employ three distinct forms of rocker arms, which we have designated in the drawings as A, B, and C respectively. The tracks or rails 20 are formed of sections of flexible cables, one end of each cable being passed downward through an opening 21, in rocker arm A, and after being passed around a pin 22, is clamped to the body of the cable by a tapered clamp 23, which is drawn within a flared portion of the opening 21. From this point the cable is extended to rocker arm B, resting in a suitable groove in said rocker arm, and from thence is extended to rocker arm C. The latter is provided with a curved opening 24, through which the cable is extended, after which it is passed around suitable anti-friction sheaves 25, the terminal of the cable being secured at 26 to the standards or pillars 11, supporting rocker arms B. Each rocker arm C is provided with two openings 24 through which cables 20 of adjoining sections are passed, said cables being extended in opposite directions, the top edge of said arm being provided with a traction surface 27, between said openings 24. The sheaves 25 are mounted in bearings 28 of brackets 29, secured in any preferred manner to the pillars or standards 11, said bearings being offset to bring the sheaves in alinement with the tracks 20. The rocker arm A is also provided with two openings 21, which are separated by an intervening traction surface 30, the contiguous ends of two cables 20 being secured to said rocker arm. Each rocker arm is also provided at each end with a downwardly curved lip 31.

A suitable weight is suspended from that portion 32 of each cable extending between sheaves 25 and point 26. In practice I preferably employ a receptacle 33 which is suspended by means of bails 34 from a carrier 35, mounted upon the cable. Said receptacle is provided with an outlet opening 36, controlled by a valve or slide 37, which is mounted upon inclined supports 38, whereby sand or the like, with which said receptacle is filled, will be directed toward said outlet opening when the slide is moved. The outward movement of the valve is limited by a stop 39. The sand or other material in the receptacles 33 of each rail or cable 20 serves to hold the cable taut between the rocker arms, the combined weight of each pair of receptacles 33 being regulated to approximate the weight of the load to be transported over said tracks. Thus the weights serve to maintain the cables in a taut condition, and any stretch in said cables may be taken up by turnbuckles 40. Any suitable motive power may be employed, but I have illustrated a trolley wire 41. As a car approaches the rocker arms, the latter are tilted under the weight of the car, assuming a position with the top face of each rocker arm in line with and forming a substantial continuation of that portion of the track which tends to sag under the weight of the car; as the latter travels over the traction portion of the rocker arms the latter are again tilted in the opposite direction to bring the traction surfaces in line with the tracks as the car passes on to the latter. The effect of this is to cause the car to coast as on a down grade, whereupon it will move at a comparatively high speed until the center of the span is reached, where the speed will be checked by the upward rise of the track. The weight of the car is sustained by the weighted receptacles 33, and it will be noted that the lips 31 form seats that reduce wear upon the cable by reason of the tilting movement of the rocker arms.

From what has been said it will be readily understood that we have produced a simple and inexpensive aerial tramway system which can be safely operated at an elevation above the normal street traffic. It will also be noted that we have produced a system of this character in which a continuous track is formed of comparatively short sections of flexible cable. It will be further observed that we have also provided efficient means by which the track cables are kept in a taut condition and said tracks constantly maintained in a condition to support any load which may pass thereover. It will also be noted that by means of our improved rocker arm the car will pass smoothly over the supports without jolt or jar, and that by mounting the rocker arms in pairs they maintain the two rails of a track always in juxtaposition.

We claim as our invention:

1. An aerial tramway, the rails of which each comprise rocker arms, a flexible cable having one end secured to one of said rocker arms and engaging the other rocker arm, and means independent of the rocker arms for maintaining a tension on said cable.

2. An aerial tramway, the rails of which each comprise rocker arms, a flexible cable loosely engaging one of said rocker arms and having one end secured to the other rocker arm, and means independent of the rocker arms for maintaining a tension on said cable.

3. An aerial tramway, the rails of which each comprise rocker arms, a flexible cable passed through one of said rocker arms and having one end secured to the other rocker arm, means for securing the other end of said cable independent of the rocker arms for maintaining a tension on said cable.

4. An aerial tramway, the rails of which each comprise rocker arms, one of said arms being provided with an opening, a flexible cable having one end secured in said opening, said cable loosely engaging the other rocker arm, and means independent of the rocker arms for maintaining a tension on said cable.

5. An aerial tramway, the rails of which each comprise rocker arms, one of said arms being provided with an opening, a pin in said opening, a flexible cable loosely engaging the other rocker arm and having one end looped around said pin, and means independent of the rocker arms for maintaining a tension on said cable.

6. An aerial tramway, the rails of which each comprise rocker arms, one of said arms being provided with an opening having a tapered portion, a flexible cable loosely engaging the other rocker arm and having a tapered clamp secured to one end and fitting in said tapered opening, and means independent of the rocker arms for maintaining a tension on said cable.

7. An aerial tramway, the rails of which each comprise rocker arms, one of said arms being provided with an opening, a cable passed through said opening and having one end secured to the other rocker arm, and means for maintaining a tension on said cable.

8. An aerial tramway comprising supports, rails each formed of rocker arms mounted on said supports, and a flexible cable passed through one of said rocker arms, one end of said cable being secured to the other rocker arm, and the other end to one of said supports, and means for maintaining a tension on said cable.

9. An aerial tramway comprising supports, rails each formed of rocker arms mounted on said supports, and a flexible cable passed through one of said rocker arms, one end of said cable being secured to the other rocker arm to form a traction portion, the other end of said cable being secured to one of said supports to form a depending tension loop, and means engaging said tension loop to maintain a tension upon the traction portion of said cable.

10. An aerial tramway comprising supports, rails each formed of rocker arms mounted on said supports, and a flexible cable passed through one of said rocker arms, one end of said cable being secured to the other rocker arm to form a traction portion, the other end of said cable being supported to form a depending tension loop, and a weight suspended from said tension loop.

11. An aerial tramway comprising rails each formed of rocker arms, and a flexible cable extending between said rocker arms, to form a traction portion, said cable being passed through the other rocker arm and having its end secured to form a suspended tension portion, and a tension device engaging said portion.

12. An aerial tramway comprising rails each formed of rocker arms, and a flexible cable extending between said rocker arms, to form a traction portion, said cable being passed through the other rocker arm and having its end secured to form a suspended tension portion, sheaves around which said tension portion is passed, and a tension device engaging said tension portion.

13. An aerial tramway comprising rails each formed of rocker arms, and a flexible cable extending between said rocker arms, to form a traction portion, said cable being passed through the other rocker arm and having its end secured to form a suspended tension portion, and a weight suspended from said tension portion.

14. An aerial tramway comprising rails each formed of rocker arms, and a flexible cable extending between said rocker arms, to form a traction portion, said cable being passed through the other rocker arm and having its end secured to form a suspended tension portion, sheaves around which said tension portion is passed, and a weight suspended from said tension portion.

15. An aerial tramway comprising rails each formed of rocker arms, and a flexible cable extending between said rocker arms to form a traction portion, said cable being passed through the other rocker arm and having its end secured to form a suspended tension portion, a carrier mounted on said tension portion, and a receptacle suspended from said carrier.

16. An aerial tramway comprising rails each formed of rocker arms, and a flexible cable extending between said rocker arms to form a traction portion, said cable being passed through the other rocker arm and having its end secured to form a suspended tension portion, a carrier mounted on said tension portion, a weight receptacle suspended from said carrier, and means for varying the weight of said receptacle.

17. An aerial tramway comprising supports, rails each formed of rocker arms, and a flexible cable supported by said rocker arms and provided with traction and tension portions, and a weight suspended from said tension portion.

18. An aerial tramway comprising supports, rails each formed of rocker arms, and a flexible cable supported by said rocker arms and provided with traction and tension portions, anti-friction sheaves engaging the tension portion of said cable, and a weight suspended from said tension portion.

19. An aerial tramway comprising supports, rails each formed of rocker arms, and a flexible cable supported by said rocker arms and provided with tension portions, brackets secured to said supports and provided with offset bearings, anti-friction sheaves mounted in said bearings and engaging the tension portion of said cable, and weights suspended from said tension portion.

20. An aerial tramway comprising supports, rails each formed of rocker arms, and a flexible cable supported by said rocker arms and provided with traction and tension portions, a carrier mounted upon said tension portion, and a weight receptacle suspended from said carrier.

21. An aerial tramway comprising supports, rails each formed of rocker arms, and a flexible cable supported by said rocker arms and provided with traction and tension portions, an adjustable connection for the end of said tension portion, and a weight suspended from said tension portion.

22. An aerial tramway comprising supports, rails each formed of rocker arms, and a flexible cable supported by said rocker arms and provided with traction and tension portions, means for taking up the slack on said cable, and a weight suspended from said tension portion.

In testimony whereof we affix our signature in presence of two witnesses.

ORRIN J. DAVY.
EDMUND H. BECKER.

Witnesses:
F. LIEBSCHUTZ,
EDWARD LACY.